(12) United States Patent
Oblak

(10) Patent No.: US 9,468,938 B2
(45) Date of Patent: Oct. 18, 2016

(54) FLEXIBLE HANDHELD SHOWER HEAD SPRAYER SYSTEM

(71) Applicant: Jeff Oblak, Brook Park, OH (US)

(72) Inventor: Jeff Oblak, Brook Park, OH (US)

(*) Notice: Subject to any disclaimer, the term of this patent is extended or adjusted under 35 U.S.C. 154(b) by 0 days.

(21) Appl. No.: 14/727,899

(22) Filed: Jun. 2, 2015

(65) Prior Publication Data

US 2015/0266037 A1  Sep. 24, 2015

(51) Int. Cl.
| | | |
|---|---|---|
| *B05B 15/08* | (2006.01) | |
| *B05B 1/18* | (2006.01) | |
| *B05B 15/10* | (2006.01) | |
| *E03C 1/04* | (2006.01) | |
| *F16L 11/20* | (2006.01) | |
| *F16L 11/12* | (2006.01) | |

(52) U.S. Cl.
CPC .............. *B05B 1/18* (2013.01); *B05B 15/10* (2013.01); *E03C 1/0408* (2013.01); *F16L 11/12* (2013.01); *F16L 11/20* (2013.01)

(58) Field of Classification Search
CPC ........................................................ B05B 1/18
USPC ........................................................ 239/525
See application file for complete search history.

(56) References Cited

U.S. PATENT DOCUMENTS

| | | | | |
|---|---|---|---|---|
| 6,164,570 | A  * | 12/2000 | Smeltzer ....................... | 239/588 |
| 8,936,046 | B2 * | 1/2015 | Ragner ......................... | 138/119 |
| 2001/0010339 | A1 * | 8/2001 | Thomas ........................ | 239/195 |
| 2005/0103903 | A1 * | 5/2005 | Shamir et al. .............. | 239/587.2 |
| 2008/0156903 | A1 * | 7/2008 | Leber ............................ | 239/532 |
| 2013/0087205 | A1 * | 4/2013 | Berardi ........................... | 137/1 |
| 2013/0213514 | A1 * | 8/2013 | Berardi ........................ | 138/109 |

\* cited by examiner

*Primary Examiner* — Arthur O Hall
*Assistant Examiner* — Adam J Rogers
(74) *Attorney, Agent, or Firm* — Barry Choobin; Patent 360

(57) ABSTRACT

The embodiments herein provide a handheld shower head sprayer with a flexible hose arrangement that automatically expands or contracts according to user convenience. The handheld shower head sprayer comprises shower arm, handheld shower sprayer, and flexible shower hose. The shower hose comprises an elastic inner tube concentrically positioned inside a non-elastic outer tube. When shower water valve is opened, water passes through the shower hose and expands the shower hose up. The radial expansion of the inner tube is constrained by maximum diameter of the outer tube. When the shower water valve is closed, the water pressure inside the shower hose is released and the shower hose automatically contracts to the unexpanded length of the hose.

16 Claims, 3 Drawing Sheets

FLEXIBLE HANDHELD SHOWER HEAD SPRAYER SYSTEM

BACKGROUND

1. Technical Field

The embodiments herein are generally related to construction industry. The embodiments herein are particularly related to bathroom fittings and accessories such as a handheld shower head sprayers. The embodiments herein are more particularly related a handheld shower head sprayer with a flexible hose arrangement.

2. Description of the Related Art

Handheld shower head sprayers, also known as handheld shower massagers or handheld showerheads, offer a convenient way for taking shower bath or for washing soap and dirt from the body. These handheld shower sprayers are also used for bathing children, pets and for cleaning tubs or shower surround in an easier way or while giving shampoos in beauty parlors and saloon shops.

A conventional handheld shower sprayer comprises a shower head with a handle portion, and a hose. The shower head portion includes shower head face with nozzles and openings. The openings deliver water to a user from the handheld shower head. The handle portion provides a hand grip structure for a user to hold the showerhead sprayer while taking a shower. The handle portion is connected to an existing shower stems with the long rubber hose or tubing. The hose provides a range of motions through which the shower head is easily moved to spray water on the desired body portion while taking a shower.

The additional features of the handheld shower heads include safety handles, straps, diverter valves, controls and so on. Among the other features, hose length is an important feature to be considered while buying a handheld shower head. In some existing models, the length of the hose is too long. As a result, the hose tangles around itself or kink on user while user takes a shower. The tangling of hose also affects the water flow in the shower head. Further, tangled hoses are difficult to snap the unit back onto its mounting bracket. In some other models, the length of the hose is too small to move the shower head to a desired body portion or space.

Hence, there is a need for a handheld shower head sprayer with a flexible hose arrangement that automatically expands or contracts according to user convenience. There is also a need for a handheld shower head sprayer with a flexible hose arrangement that provides convenience for washing soap and dirt from body or for cleaning the body while taking a shower. There is also a need for a handheld shower head sprayer with a flexible hose arrangement that does not tangle around a user or kink on user while the user takes a shower.

The above mentioned shortcomings, disadvantages and problems are addressed herein and which will be understood by reading and studying the following specification.

OBJECT OF THE EMBODIMENTS HEREIN

The primary object of the embodiments herein is to provide a handheld shower head sprayer with a flexible hose arrangement that automatically expands or contracts according to user convenience.

Another object of the embodiments herein is to provide a handheld shower head sprayer with a flexible or expandable hose arrangement that provides convenience for washing soap and dirt from body or for cleaning the body while taking a shower.

Yet object of the embodiments herein is to provide a handheld shower head sprayer with a flexible hose arrangement that automatically expands longitudinally and laterally when a pressurized fluid is introduced into the hose.

Yet another object of the embodiments herein is to provide a handheld shower head sprayer with a flexible hose arrangement that contracts to the original length of the hose when fluid pressure is released within the hose.

Yet another object of the embodiments herein is to provide a handheld shower head sprayer with a flexible hose arrangement that does not tangle around a user or kink on the user while the user takes a shower.

These and other objects and advantages of the embodiments herein will become readily apparent from the following detailed description taken in conjunction with the accompanying drawings.

SUMMARY

The following details present a simplified summary of the embodiments herein to provide a basic understanding of some aspects of the embodiments herein. This summary is not an extensive overview of the embodiments herein. It is not intended to identify key/critical elements of the embodiments herein or to delineate the scope of the embodiments herein. Its sole purpose is to present brief concept of the embodiments herein in a simplified form as a prelude to the more detailed description that is presented later.

The objects and advantages of the embodiments herein will become readily apparent from the following summary taken in conjunction with the accompanying drawings.

According to an embodiment herein, a handheld shower head sprayer system is provided. The system comprising a handheld shower sprayer with a spray head, a shower hose assembly, and a shower arm mounted on a shower wall. The shower hose assembly comprises an inner tube and an outer tube. The shower arm is coupled to the handheld shower sprayer through the shower hose. The inner tube of the shower hose is positioned concentrically within the outer tube of the shower hose both in a contacted condition and in an expanded condition. The outer tube of the shower hose is configured to move laterally and longitudinally with respect to the inner tube, when the inner tube is switched between the contracted condition and the expanded condition.

According to an embodiment herein, a first end of the outer tube is secured to a first end of the inner tube and a second end of the outer tube is secured to a second end of the inner tube.

According to an embodiment herein, the inner tube of the shower hose is switched to the expanded condition from the contracted condition, when a pressurized fluid is introduced into the shower hose from the shower arm.

According to an embodiment herein, the inner tube of the shower hose is switched to the contracted condition from the expanded condition when the pressurized fluid is not introduced into the shower hose from the shower arm.

According to an embodiment herein, the inner tube expands radially outwards or laterally, with respect to a length of the inner tube, and wherein a radial expansion of the inner tube is constrained by maximum diameter of the outer tube.

According to an embodiment herein, the inner tube of the shower hose is formed from an elastic material.

According to an embodiment herein, the outer tube of the shower hose is formed from a non-elastic, bendable, tubular webbing material.

According to an embodiment herein, the inner tube expands longitudinally and laterally up to six times of an original size of the shower hose in the expanded condition.

According to an embodiment herein, the inner tube contracts to the original size of the shower hose in the contracted condition.

According to an embodiment herein, the inner tube of the shower hose is formed from natural latex rubber and wherein a length of the inner tube is expanded 2.5 to 2.8 times the length of the inner tube in the contracted condition.

According to an embodiment herein, the outer tube of the shower hose is formed from braided or woven nylon, polyester, or polypropylene materials.

According to an embodiment herein, a method is provided for expanding and contracting a shower hose of a handheld shower head sprayer according to user convenience. The method comprising steps of introducing a pressurized fluid into the shower hose by opening a shower water valve, and wherein the shower hose comprises an inner tube and an outer tube. The inner hose and the outer hose are expanded longitudinally and laterally by introducing a pressurized fluid inside the shower hose. The expanded shower hose is contracted to an original length of the shower hose by releasing the pressurized fluid pressure inside the shower hose through the shower water valve.

According to an embodiment herein, the inner tube of the shower hose is switched to the expanded condition from the contracted condition when a pressurized fluid is introduced into the shower hose from the shower arm.

According to an embodiment herein, the inner tube of the shower hose is switched to the contracted condition from the expanded condition when the pressurized fluid is not introduced into the shower hose from the shower arm.

According to an embodiment herein, the inner tube expands radially outwards or laterally, with respect to a length of the inner tube, and wherein a radial expansion of the inner tube is constrained by maximum diameter of the outer tube.

According to an embodiment herein, the inner tube of the shower hose is formed from an elastic material.

According to an embodiment herein, the outer tube of the shower hose is formed from a non-elastic, bendable, tubular webbing material.

According to an embodiment herein, the inner tube expands longitudinally and laterally up to six times of an original size of the shower hose in the expanded condition.

According to an embodiment herein, the inner tube contracts to the original size of the shower hose in the contracted condition.

According to an embodiment herein, wherein the inner tube of the shower hose is formed from natural latex rubber and wherein a length of the inner tube is expanded 2.5 to 2.8 times the length of the inner tube in the contracted condition.

According to an embodiment herein, the outer tube of the shower hose is formed from braided or woven nylon, polyester, or polypropylene materials.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
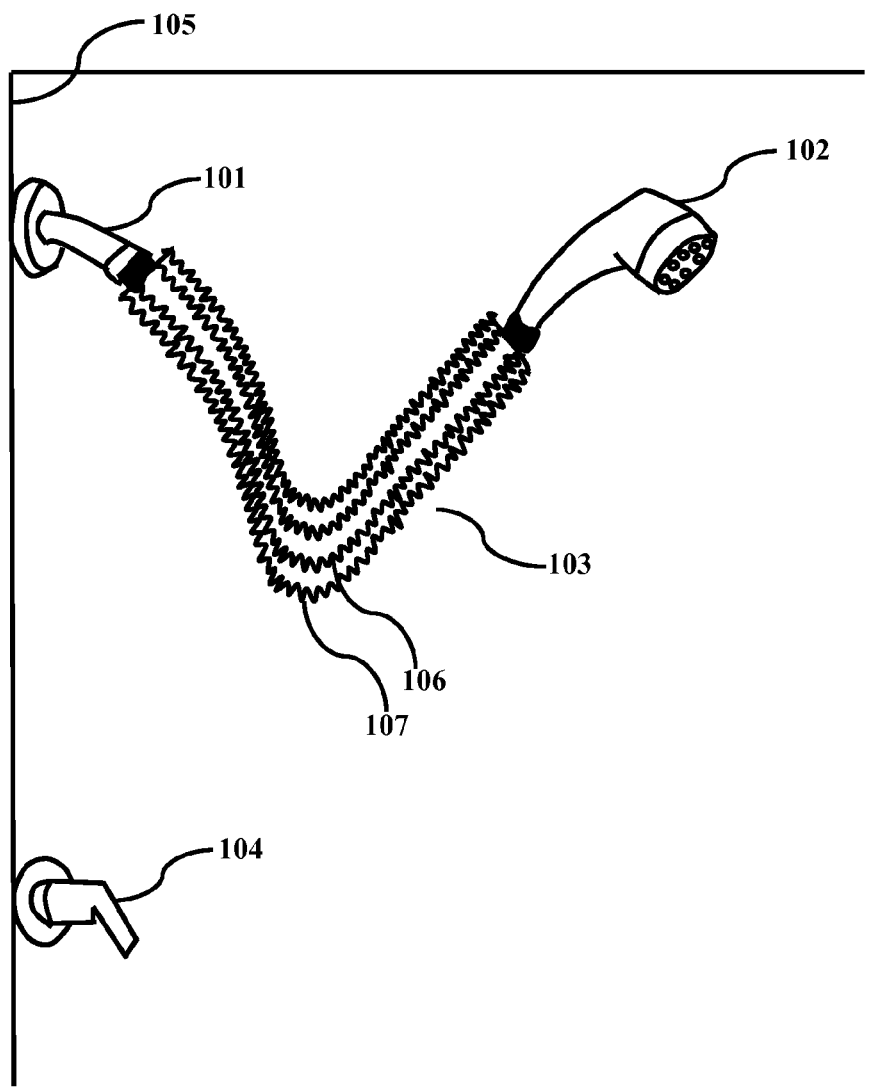
FIG. 1 illustrates a front view of a handheld shower head sprayer with a flexible hose arrangement when the hose is in relaxed or contracted position, according to an embodiment herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

According to an embodiment herein, a handheld shower head sprayer system is provided. The system comprising a handheld shower sprayer with a spray head, a shower hose assembly, and a shower arm mounted on a shower wall. The shower hose assembly comprises an inner tube and an outer tube. The shower arm is coupled to the handheld shower sprayer through the shower hose. The inner tube of the shower hose is positioned concentrically within the outer tube of the shower hose both in a contacted condition and in an expanded condition. The outer tube of the shower hose is configured to move laterally and longitudinally with respect to the inner tube, when the inner tube is switched between the contracted condition and the expanded condition.

According to an embodiment herein, a first end of the outer tube is secured to a first end of the inner tube and a second end of the outer tube is secured to a second end of the inner tube.

According to an embodiment herein, the inner tube of the shower hose is switched to the expanded condition from the contracted condition, when a pressurized fluid is introduced into the shower hose from the shower arm.

According to an embodiment herein, the inner tube of the shower hose is switched to the contracted condition from the expanded condition when the pressurized fluid is not introduced into the shower hose from the shower arm.

According to an embodiment herein, the inner tube expands radially outwards or laterally, with respect to a length of the inner tube, and wherein a radial expansion of the inner tube is constrained by maximum diameter of the outer tube.

According to an embodiment herein, the inner tube of the shower hose is formed from an elastic material.

According to an embodiment herein, the outer tube of the shower hose is formed from a non-elastic, bendable, tubular webbing material.

According to an embodiment herein, the inner tube expands longitudinally and laterally up to six times of an original size of the shower hose in the expanded condition.

According to an embodiment herein, the inner tube contracts to the original size of the shower hose in the contracted condition.

According to an embodiment herein, the inner tube of the shower hose is formed from natural latex rubber and wherein a length of the inner tube is expanded 2.5 to 2.8 times the length of the inner tube in the contracted condition.

According to an embodiment herein, the outer tube of the shower hose is formed from braided or woven nylon, polyester, or polypropylene materials.

According to an embodiment herein, a method is provided for expanding and contracting a shower hose of a handheld shower head sprayer according to user convenience. The method comprising steps of introducing a pressurized fluid into the shower hose by opening a shower water valve, and wherein the shower hose comprises an inner tube and an outer tube. The inner hose and the outer hose are expanded longitudinally and laterally by introducing a pressurized fluid inside the shower hose. The expanded shower hose is contracted to an original length of the shower hose by releasing the pressurized fluid pressure inside the shower hose through the shower water valve.

According to an embodiment herein, the inner tube of the shower hose is switched to the expanded condition from the contracted condition when a pressurized fluid is introduced into the shower hose from the shower arm.

According to an embodiment herein, the inner tube of the shower hose is switched to the contracted condition from the expanded condition when the pressurized fluid is not introduced into the shower hose from the shower arm.

According to an embodiment herein, the inner tube expands radially outwards or laterally, with respect to a length of the inner tube, and wherein a radial expansion of the inner tube is constrained by maximum diameter of the outer tube.

According to an embodiment herein, the inner tube of the shower hose is formed from an elastic material.

According to an embodiment herein, the outer tube of the shower hose is formed from a non-elastic, bendable, tubular webbing material.

According to an embodiment herein, the inner tube expands longitudinally and laterally up to six times of an original size of the shower hose in the expanded condition.

According to an embodiment herein, the inner tube contracts to the original size of the shower hose in the contracted condition.

According to an embodiment herein, wherein the inner tube of the shower hose is formed from natural latex rubber and wherein a length of the inner tube is expanded 2.5 to 2.8 times the length of the inner tube in the contracted condition.

According to an embodiment herein, the outer tube of the shower hose is formed from braided or woven nylon, polyester, or polypropylene materials.

The various embodiments herein provide a handheld shower head sprayer with a flexible hose arrangement that automatically expands or contracts according to user convenience. The handheld shower head sprayer comprises a shower arm, a handheld shower sprayer, and a shower hose. The handheld shower sprayer further comprises a handle and a spray head with nozzles or openings. The handle allows a user to hold the shower sprayer in position while taking a shower. The shower arm is mounted on a shower wall and is coupled to the handheld shower sprayer through the shower hose. The shower wall is a suitable support structure that has plumbing fittings. A shower water valve is fitted to the shower wall to control the flow of water in the handheld shower sprayer.

According to an embodiment herein, the shower hose comprises two separate and distinct tubes. the two tubes are an inner tube and an outer tube. The inner tube is made from an elastic material and the outer tube is made from a non-elastic material. The inner tube is positioned concentrically within the outer tube. The outer tube is secured to the inner tube only at a first end and a second end of the inner and outer tubes.

According to an embodiment herein, the inner tube is formed from an elastic material with an elongation ratio of up to 6 to 1. When a pressurized fluid such as water is introduced into the inner tube, the inner tube expands up to 4 to 6 times of the relaxed or unexpanded length of the inner tube.

According to an embodiment herein, the inner tube of the shower hose is made from natural latex rubber and the length of the inner tube expands up to 2.5 to 2.8 times of the original or contracted length of the inner tube.

According to an embodiment of herein, the inner tube of the shower hose is made from synthetic materials having elastic properties similar to rubber. The elastic inner tube expands radially outwardly or laterally with respect to the length of the shower hose. The radial expansion of the inner tube is constrained by the maximum diameter of the non-elastic outer tube.

According to an embodiment herein, the outer tube of the shower hose is made from non-elastic, relatively soft, bendable, tubular webbing material. The materials used to form the non-elastic outer tube are braided or woven nylon, polyester, or polypropylene and other braided or woven material. The outer tube moves laterally and longitudinally with respect to the inner tube when the inner tube is transitioning between a contracted condition and an expanded condition.

According to an embodiment herein, initially a user holds the handheld shower head sprayer in position and opens the shower water valve to take a shower. The water passes from the shower arm to the handheld shower sprayer through the flexible shower hose. Due to water pressure, the inner tube of the shower hose expands up to 6 times the unexpanded or original length of the shower hose. The outer tube of shower hose also moves laterally and longitudinally with respect to the inner tube when the inner tube transitions between a contracted condition and an expanded condition. After taking the shower, the user closes the shower water valve. The shower water valve stops the flow of water inside the shower hose. As a result, the pressure inside the shower hose is decreased and the inner tube automatically contracts to the original or unexpanded length of the shower hose.

FIG. 1 illustrates a front view of a handheld shower head sprayer with a flexible hose arrangement when the hose is in relaxed or contracted position, according to an embodiment herein. With respect to FIG. 1, the handheld shower head sprayer comprises shower arm 101, handheld shower sprayer 102, and shower hose 103. The handheld shower sprayer 102 further comprises a handle and a spray head with nozzles or openings. The handle allows a user to hold the shower sprayer 102 in position while taking a shower. The shower arm 101 is mounted on the shower wall 105. The shower wall 105 is a suitable support structure that has plumbing fittings. The handheld shower sprayer 102 is coupled to the shower arm 101 through the shower hose 103. The shower water valve 104 is fitted to the shower wall 105 and controls the flow of water in the handheld shower sprayer 102.

According to an embodiment herein, the shower hose 103 comprises two separate and distinct tubes: an inner tube and an outer tube. The inner tube is made from an elastic material and the outer tube is made from a non-elastic material. The inner tube is positioned concentrically within the outer tube. The outer tube is secured to the inner tube only at a first end and a second end of the inner and outer tubes.

According to an embodiment herein, the inner tube of the shower hose 103 is formed from an elastic material with an elongation ratio of up to 6 to 1. When a pressurized fluid such as water is introduced into the inner tube, the inner tube expands up to 4 to 6 times of the relaxed or unexpanded length of the inner tube.

According to an embodiment herein, the inner tube of the shower hose 103 is made from natural latex rubber and the length of the inner tube expands up to 2.5 to 2.8 times of the original or contracted length of the inner tube.

According to an embodiment of herein, the inner tube of the shower hose 103 is made from synthetic materials having elastic properties similar to rubber. The elastic inner tube expands radially outwards or laterally with respect to the length of the shower hose. The radial expansion of the inner tube is constrained by the maximum diameter of the non-elastic outer tube.

According to an embodiment herein, the outer tube of the shower hose 103 is made from non-elastic, relatively soft, bendable, tubular webbing material. The materials used to form the non-elastic outer tube are braided or woven nylon, polyester, or polypropylene and other braided or woven material. The outer tube moves laterally and longitudinally with respect to the inner tube when the inner tube is transitioning between a contracted condition and an expanded condition.

Figure 2:
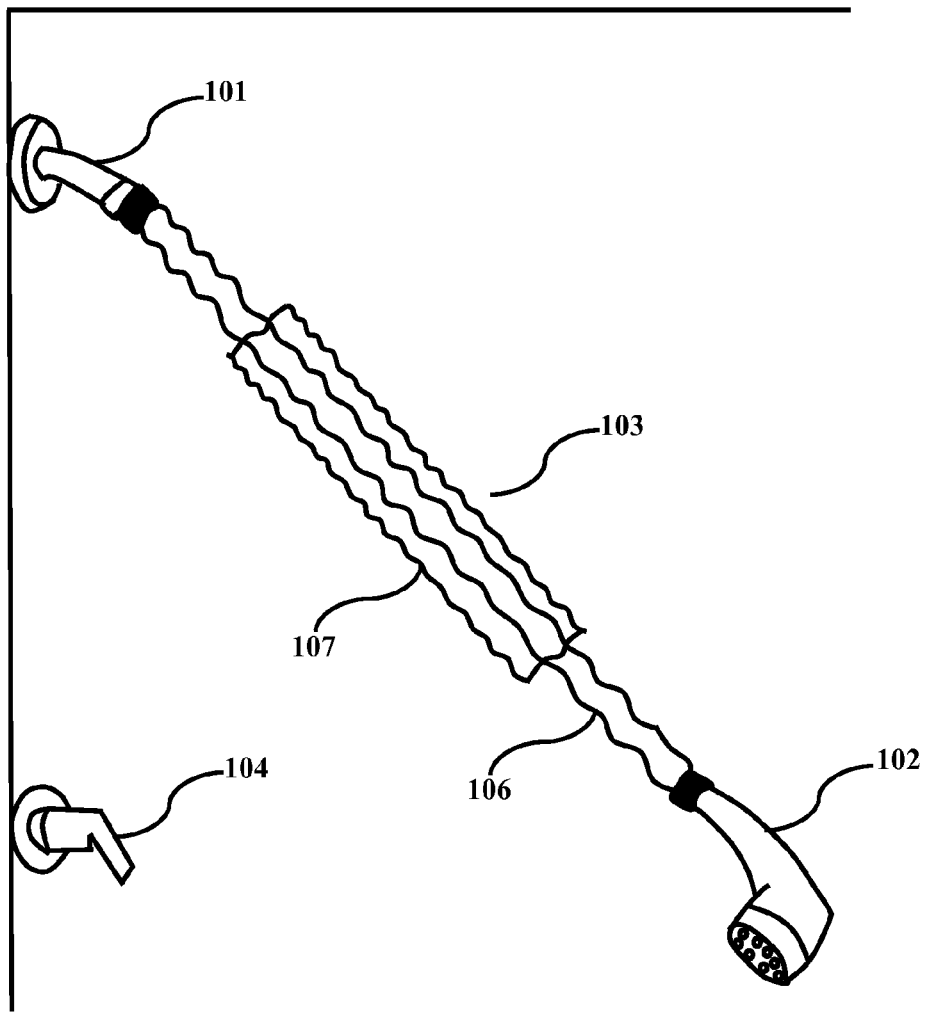
FIG. 2 illustrates a front view of a handheld shower head sprayer with a flexible hose arrangement when the hose is in working or expanded position, according to an embodiment herein.

FIG. 2 illustrates a front view of a handheld shower head sprayer with a flexible hose when the hose is in working or expanded position, according to an embodiment herein. The shower water valve 104 is mounted on the shower wall 105. When the shower water valve 104 is opened, the water flows from the shower arm 101 to the handheld shower sprayer 102 through the shower hose 103. Due to water pressure, the elastic inner tube of the shower hose 103 expands up to 4 to 6 times of the relaxed or unexpanded length of the inner tube. The radial expansion of the inner tube is constrained by the maximum diameter of the non-elastic outer tube.

Figure 3:
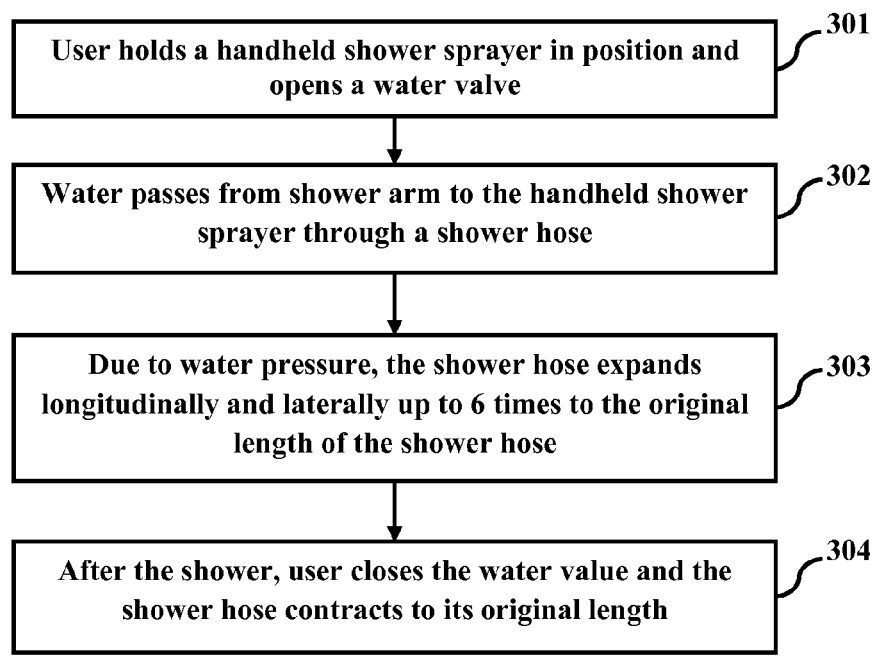
FIG. 3 illustrates a flow chart explaining a method of working of a handheld shower head sprayer with a flexible hose arrangement while a user takes shower, according to an embodiment herein.

FIG. 3 illustrates a flow chart explaining a method of working of a handheld shower head sprayer with a flexible hose arrangement while a user takes shower, according to an embodiment herein. Initially, the user holds the handheld shower head sprayer in position and opens a shower water valve to take a shower (301). The water passes from the shower arm to the handheld shower sprayer through the flexible shower hose (302). Due to water pressure, the inner tube of the shower hose expands up to 6 times to the unexpanded or original length of the shower hose (303). The outer tube of shower hose also moves laterally and longitudinally with respect to the inner tube when the inner tube transitions between a contracted condition and an expanded condition. After taking the shower, the user closes the shower water valve. The shower water valve stops the flow of water inside the shower hose. As a result, the pressure inside the shower hose is decreased and the inner tube automatically contracts to the original or unexpanded length of the shower hose (304).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:
1. A handheld shower head sprayer system consisting of:
a handheld shower sprayer with a spray head;
a shower hose assembly, and wherein the shower hose assembly comprises an inner tube and an outer tube; and
a shower arm mounted on a shower wall, and wherein the shower arm is coupled to the handheld shower sprayer through the shower hose assembly;
a shower water valve fitted to the shower wall to control the flow of water in the handheld shower sprayer;
wherein the inner tube of the shower hose assembly is positioned concentrically within the outer tube of the shower hose both in a contacted condition and in an expanded condition, and wherein the outer tube of the shower hose assembly is configured to move laterally and longitudinally with respect to the inner tube, when the inner tube is switched between the contracted condition and the expanded condition, wherein the inner tube of the shower hose assembly is formed from natural latex rubber and wherein a length of the inner tube is expanded 2.5 to 2.8 times the length of the inner tube in the contracted condition, wherein the inner tube expands longitudinally and laterally up to six times of an original size of the shower hose assembly in the expanded condition, wherein the inner tube is made of natural latex rubber expands according to the pressure of the water flowing through the inner tube when the shower water valve is open, and the inner tube contracts when the water flow is stopped via closing the shower water valve.

2. The system according to claim 1, wherein a first end of the outer tube is secured to a first end of the inner tube and a second end of the outer tube is secured to a second end of the inner tube.

3. The system according to claim 1, wherein the inner tube of the shower hose is switched to the expanded condition from the contracted condition, when a pressurized fluid is introduced into the shower hose from the shower arm.

4. The system according to claim 1, wherein the inner tube of the shower hose is switched to the contracted condition from the expanded condition when the pressurized fluid is not introduced into the shower hose from the shower arm.

5. The system according to claim 1, wherein the inner tube expands radially outwards or laterally, with respect to a length of the inner tube, and wherein a radial expansion of the inner tube is constrained by maximum diameter of the outer tube.

6. The system according to claim 1, wherein the inner tube of the shower hose is formed from an elastic material.

7. The system according to claim 1, wherein the outer tube of the shower hose is formed from a non-elastic, bendable, tubular webbing material.

8. The system according to claim 1, wherein the inner tube contracts to the original size of the shower hose in the contracted condition.

9. The system according to claim 1, wherein the outer tube of the shower hose is formed from braided or woven nylon, polyester, or polypropylene materials.

10. A method for expanding and contracting a shower hose assembly of a handheld shower head sprayer according to user convenience, the method consisting steps of:
   introducing a pressurized fluid into the shower hose assembly by opening a shower water valve, and wherein the shower hose assembly comprises an inner tube and an outer tube;
   expanding the inner tube made of natural latex rubber, radially and laterally by introducing a pressurized fluid inside the shower hose assembly, wherein the inner tube of the shower hose assembly is formed from natural latex rubber and wherein a length of the inner tube is expanded 2.5 to 2.8 times the length of the inner tube in the contracted condition, wherein the inner tube expands longitudinally and laterally up to six times of an original size of the shower hose assembly in the expanded condition; and
   contracting the expanded inner tube, to an original length of the inner tube by releasing the pressurized fluid pressure inside the shower hose assembly through the shower water valve.

11. The method according to claim 10, wherein the inner tube of the shower hose is switched to the expanded condition from the contracted condition when a pressurized fluid is introduced into the shower hose from the shower arm, and wherein the inner tube of the shower hose is switched to the contracted condition from the expanded condition when the pressurized fluid is not introduced into the shower hose from the shower arm.

12. The method according to claim 10, wherein the inner tube expands radially outwards or laterally, with respect to a length of the inner tube, and wherein a radial expansion of the inner tube is constrained by maximum diameter of the outer tube.

13. The method according to claim 10, wherein the inner tube of the shower hose is formed from an elastic material.

14. The method according to claim 10, wherein the outer tube of the shower hose is formed from a non-elastic, bendable, tubular webbing material.

15. The method according to claim 10, wherein the inner tube contracts to the original size of the shower hose in the contracted condition.

16. The method according to claim 10, wherein the outer tube of the shower hose is formed from braided or woven nylon, polyester, or polypropylene materials.

* * * * *